United States Patent [19]
Ikeno et al.

[11] Patent Number: 5,532,294
[45] Date of Patent: Jul. 2, 1996

[54] THIXOTROPIC FLUOROSILICONE GEL COMPOSITION

[75] Inventors: Masayuki Ikeno, Maebashi; Hiroyasu Hara, Annaka, both of Japan

[73] Assignee: Shin-Etsu Chemical Co., Ltd., Tokyo, Japan

[21] Appl. No.: 261,961

[22] Filed: Jun. 17, 1994

[30] Foreign Application Priority Data

Jun. 17, 1993 [JP] Japan ................................ 5-171050

[51] Int. Cl.$^6$ ........................................ C08K 9/06
[52] U.S. Cl. ........................... 523/212; 524/862; 524/847
[58] Field of Search ........................ 524/862, 847; 523/212

[56] References Cited

U.S. PATENT DOCUMENTS

| | | | |
|---|---|---|---|
| 5,179,159 | 1/1993 | Kishita et al. | 524/862 |
| 5,276,087 | 1/1994 | Fujiki et al. | 524/862 |

*Primary Examiner*—Melvyn I. Marquis
*Assistant Examiner*—Karen A. Dean
*Attorney, Agent, or Firm*—Cushman Darby & Cushman

[57] ABSTRACT

A silicone gel composition comprising (A) a linear organopolysiloxane having a backbone consisting only of trifluoropropyl-substituted siloxane units and terminated with alkenyl group, (B) an organohydrogenpolysiloxane, (C) a platinum catalyst, and (D) a finely powdered silica whose surfaces have been rendered hydrophobic by treatment with a silicon compound having only methyl groups as substituent groups, such as hexamethyldisilazane, trimethylchlorosilane, dimethyldichlorosilane, methyltrichlorosilane, trimethylalkoxysilane, dimethyldialkoxysilane, methyltrialkoxysilane and cyclic or linear dimethylpolysiloxanes. The composition has good thixotropy and can effectively provide a protective layer by spot potting. The silicone gel formed from the composition is excellent in solvent resistance, etc. and is effectively restrained from shrinkage or the like. Therefore the composition is highly suited to use as a protective material for semiconductor-type pressure sensors.

7 Claims, No Drawings

THIXOTROPIC FLUOROSILICONE GEL COMPOSITION

BACKGROUND OF THE INVENTION

1. Field of the Invention

The present invention relates to an addition-curable type fluorosilicone gel composition which has excellent solvent resistance and thixotropy and which, upon curing, gives a gel-like cured product.

2. Description of the Prior Art

Silicone gels are excellent in such properties as electrical insulation properties, stability of electrical properties, flexibility and so forth, and are in use for potting or encapsulation of electrical and electronic parts, for example, as a material for coating control circuit elements such as power transistors, ICs, capacitors, etc. to protect the elements from thermal and mechanical troubles.

With the advent of semiconductor-type pressure sensors utilizing the piezoresistance effect of a silicon chip, in recent years, application of electronics to sensor technology has been investigated and practiced more and more in a variety of industrial fields. For instance, the semiconductor-type pressure sensors mentioned are used as an air quantity sensor for fuel injection control in automobiles, a gasoline vapor pressure sensor in gasoline tanks, and as a water or gas pressure sensor in hot water supply systems. These pressure sensors, however, have the problem that the sensor characteristics would be changed if an electrode part is corroded by corrosive components in a measuring medium with which the sensor comes into contact or a contaminant deposits on the surface of a pressure-sensitive chip. Thus, there is a request for development of a protective material which can protect the sensor elements without adversely affecting the sensor characteristics. Such protective material is fundamentally desired to have high purity and to produce no adverse effects on sensor characteristics by, for example, surface hardness, shrinkage on cure, or swelling with solvent. As a material for meeting these requirements, silicone gels with excellent solvent resistance have come to draw attention.

Where a silicone gel is used as a protective material for a semiconductor-type pressure sensor, it is necessary, for example, to apply a gel-forming silicone composition (silicone gel composition) to the surface of the sensor by spot potting. Known silicone gel compositions, however, are high in fluidity, so that they are not suited for use in spot potting and cannot form an effective protective layer on the sensor. Thus, there is a demand for a silicone gel composition with low fluidity, for use as a protective material for the above-mentioned semiconductor-type pressure sensors.

Besides, where the fluidity of a silicone gel composition is lowered by simply increasing the viscosity thereof, the viscosity is lowered when the composition is heated for curing, so that it again is impossible to obtain an effective protective layer on a sensor of the above-mentioned type.

SUMMARY OF THE INVENTION

It is accordingly an object of the present invention to provide a silicone gel composition which is capable of forming a flexible gel-like cured product (silicone gel) and which has thixotropy such that under a shearing stress in a potting operation using a dispenser or the like it has a low apparent viscosity to ensure easy potting and that in the absence of shearing stress it has a high apparent viscosity and is free of fluidity.

The present invention provides, as a means for attaining the above object, a thixotropic fluorosilicone gel composition, comprising:

(A) an alkenyl group-containing organopolysiloxane having the following average formula (1):

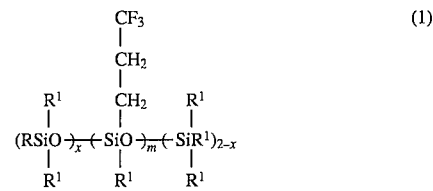

wherein R is an alkenyl group, ($R^1$)'s may be the same or different and are each an alkyl group having 1 to 8 carbon atoms, phenyl group or 3,3,3-trifluoropropyl group, x is a number in the range of 0.3 to 2, and m is an integer of not less than 1, and a viscosity of 100 to 10,000 cP at 25° C.;

(B) an organohydrogenpolysiloxane having at least 3 silicon-bonded hydrogen atoms in its molecule which has the following general formula (2):

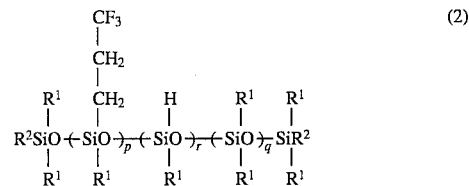

wherein ($R^1$)'s are each the same as above, ($R^2$)'s may be the same or different and are each a hydrogen atom, an alkyl group having 1 to 8 carbon atoms, phenyl group or 3,3,3-trifluoropropyl group, p and q are each an integer of not less than 0, and r is an integer of not less than 1, and a viscosity of 5 to 100 cP at 25° C.;

(C) a platinum catalyst; and (D) a finely powdered silica having a specific surface area of not less than 50 $m^2$/g which has been rendered hydrophobic by treatment with a silazane, chlorosilane or alkoxysilane polysiloxane having only methyl groups as organic substituent groups bonded to silicon atoms.

According to the present invention, a vinyl group-containing organopolysiloxane whose backbone consists of 3,3,3-trifluoropropylsiloxane units is used as a base polymer (component (A)) for a silicone gel composition, thereby ensuring resistance to solvents such as oils, and, in combination with this, a finely powdered silica which has been rendered hydrophobic by treatment with a silazane, chlorosilane, alkoxysilane or polysiloxane having only methyl groups as organic substituent groups bonded to silicon atoms (component (D)) is used, whereby a thixotropic silicone gel composition can successfully be obtained. The reason why the use of the base polymer and the finely powdered silica in combination is effective in producing thixotropy has not been elucidated. It is presumed, however, that the effect arises from the great difference between the surface energy of the 3,3,3-trifluoropropyl group in the base polymer and the surface energy of the methyl group introduced to the surfaces of the finely powdered silica.

The term "silicone gel" herein means a cured, cross-linked silicone product having a three-dimensional network structure and a penetration, as measured using a ¼-scale cone according to the method specified in ASTM D 1403, of 0 to 200.

DETAILED DESCRIPTION OF PREFERRED EMBODIMENTS

Component (A)

The organopolysiloxane of component (A) has a linear molecular structure, as apparent from the average formula (1) above. It is also seen, from the x having a value of 0.3 to 2 and the R being alkenyl in the formula (1), that not less than 15% of the both terminal ends of the organopolysiloxane moelcules are blocked with alkenylsiloxyl units. The alkenyl group in the component (A) and the SiH group in the component (B), described later, perform an addition reaction with each other, to form a silicone gel. If the value of x is less than 0.3, for example, the composition obtained will have a low crosslink density and, therefore, cannot form a gel.

It is important that the alkenyl group-containing organopolysiloxane has a backbone substantially consisting of 3,3,3-trifluoropropylsiloxane units only. If the backbone contains other siloxyl units such as ($Me_2SiO$) unit wherein Me means a methyl group, the interaction of the organopolysiloxane of component (A) with the component (D), described later, is spoiled so that the thixotropy intended cannot be obtained.

Besides, the fluorine-containing siloxane unit constituting the backbone of the organopolysiloxane leads to good resistance to solvents. That is, the silicone gel obtained will generate little stress due to swelling with a solvent or the like, and can therefore protect a sensor without causing any adverse effect on the functions of the sensor.

Typically, the alkenyl group R in the average formula (1) above includes, for example, vinyl, allyl, propenyl, isopropenyl, butenyl, hexenyl, cyclohexenyl and the like typically having 2 to 8 carbon atoms, preferably having 2 to 6 carbon atoms, among which normally preferred is the vinyl and allyl group. Each $R^1$ is selected from the group consisting of alkyl groups having 1 to 8 carbon atoms, phenyl group and 3,3,3-trifluoropropyl group. The alkyl groups of 1 to 8 carbon atoms, preferably having 1 to 6 carbon atoms, include, for example, methyl, ethyl, propyl, isopropyl, butyl, tert-butyl, hexyl, cyclohexyl, octyl and the like. In the present invention, a preferable $R^1$ is the methyl group.

In the average formula (1), m may be any integer with a value of not less than 1. However, the organopolysiloxane should have a viscosity at 25° C. of 100 to 10,000 cP, preferably 400 to 5,000 cP. For this, m in the average formula (1) is preferably an integer of 10 to 200, more preferably 10 to 150. If the viscosity is outside of the specified range, it is difficult to obtain a silicone gel with good physical properties.

The alkenyl group-containing organopolysiloxane of component (A) described above can be obtained, for example, by subjecting cyclic trimer of methyl-3,3,3-trifluoropropylsiloxane to ring-opening polymerization in the presence of a pentacoordinate silicon catalyst. The ring-opening polymerization is known per se, and may be carried out, for example, by reacting water, a silanol-terminated organopolysiloxane, or a triorganosilanol or the like with the methyl-3,3,3-trifluoropropylsiloxane cyclotrimer in the presence of a pentacoordinate silicon catalyst, as disclosed in U.S. Pat. No. 3,445,426 corresponding to Japanese Examined Patent Publication (KOKOKU) No. 45-1070. In the present invention, the reaction is preferably carried out at a temperature of 50° C. or below.

If the reaction temperature is higher than 50° C., methyl-3,3,3-trifluoropropylsiloxane cyclo-tetramer and pentamer ($F_4$, $F_5$) are normally by-produced in large quantities, the by-products being difficult to distill off under a reduced pressure. Where an organopolysiloxane obtained in this manner is used as the component (A) in the composition of the present invention, the resulting silicone gel contains large amounts of $F_4$ and $F_5$ which do not take part in cross-linking, so that when the gel is placed in an environment including a solvent, the $F_4$ and $F_5$ are extracted with the solvent and the gel shrinks accordingly. Where such silicone gel is used as a protective material for a pressure sensor, therefore, the shrinkage of gel due to the $F_4$ and $F_5$ extraction exerts adverse effects on the sensor characteristics. Where the reaction temperature is at or below 50° C., by-production of $F_4$ and $F_5$ can be suppressed satisfactorily so that the resulting organopolysiloxane is suited to use as the component (A) in the composition of the present invention.

Component (B)

The component (B) is an organohydrogenpolysiloxane having the above general formula (2), which acts as a cross-linking agent to perform an addition reaction with the alkenyl group of the above-described component (A), resulting in formation of a silicone gel. Therefore, the organohydrogenpolysiloxane must have at least three silicon-bonded hydrogen atoms (namely, SiH groups) in its molecule.

In the general formula (2), $R^1$ are each as defined in the above average formula (1), a particularly preferable $R^1$ being the methyl group. $R^2$ are each selected from the group consisting of hydrogen atom, alkyl groups having 1 to 8 carbon atoms, phenyl group, and 3,3,3-trifluoropropyl group. The alkyl groups of 1 to 8 carbon atoms include, for example, methyl, ethyl, propyl, isopropyl, butyl, tert-butyl, hexyl, cyclohexyl, octyl and the like. Particularly preferable examples of $R^2$ are methyl group and hydrogen atom. p and q are each an integer of not less than 0, and r is an integer of not less than 1. The organohydrogenpolysiloxane should have a viscosity at 25° C. of 5 to 100 cP, in view of ease of synthesis and workability. For this, in the general formula (2), p is preferably an integer of 0 to 50, more preferably 3 to 20; q preferably an integer of 0 to 20; and r preferably 1 to 20, more preferably 4 to 12.

The component (B) is preferably present in an amount such as to provide 0.5 to 2.0 silicon-bonded hydrogen atoms, more preferably 0.8 to 1.5 silicon-bonded hydrogen atoms, per alkenyl group in the component (A).

Component (C)

The platinum catalyst of component (C) is a catalyst for accelerating the addition reaction between the alkenyl groups in the component (A) and the SiH groups in the component (B), and is known per se. Typical examples include chloroplatinic acid, alcohol-modified chloroplatinic acid solution, coordinate compounds of chloroplatinic acid with an olefin or vinylsiloxane, and the like.

The component (C) is present in a so-called catalytic amount, which is normally not less than 1 ppm, preferably 1 to 500 ppm, more preferably 3 to 100 ppm (in terms of platinum), based on the component (A).

Component (D)

The finely powdered silica of component (D) is a filler component which plays an important role in imparting thixotropy to the composition before curing, as has been mentioned above. This component will neither be extracted with solvent or the like nor shrink after curing of the composition. When the composition is used as a protective material for a sensor or the like, this component does not cause any adverse effects on sensor characteristics.

The finely powdered silica is used for producing sufficient thixotropy through interaction with the component (A). For accomplishing this purpose, the finely powdered silica must meet two requirements, one of which is that the finely powdered silica has a specific surface area of at least 50 m²/g, preferably of 50–400 m²/g, and the other is that the surfaces of the finely powdered silica have been rendered hydrophobic by treatment with a silazane, chlorosilane, alkoxysilane or polysiloxane having only methyl groups as organic substituent groups bonded to silicon atoms. The intended thixotropy cannot be imparted to the composition unless the above two requirements are both fulfilled.

Agents for the surface treatment described above include, for example, hexamethyldisilazane, trimethylchlorosilane, dimethyldichlorosilane, methyltrichlorosilane, trimethylalkoxysilane, dimethyldialkoxysilane, methyltrialkoxysilane wherein the alkoxy group can be methoxy, ethoxy, propoxy, butoxy groups, etc., cyclic or linear polydimethyl siloxanes and the like, which may be used either singly or in combination of two or more. The dimethylpolysiloxanes may be cyclic or linear. Normally, the finely powdered silica having been rendered hydrophobic preferably contains carbon on its surfaces in an amount of 0.3–8% by weight based thereon. The surface-treating agents are preferably high-purity chemicals, because the purity of the agent affects greatly the purity of the resulting composition.

The high-purity finely powdered silicas include, for example, those commercially available under the respective tradenames of Aerosil-812, R-812S, R-972 and R-974 (produced by Degussa), Rheorosil MT-30 (produced by Tokuyama Soda Co., Ltd.), Nipsil SS series (produced by Nippon Silica Co., Ltd.), Cabosil TS-720 (produced by Cabot) and so on.

Normally, these finely powdered silicas are preferably present in an amount of 0.5 to 10 parts by weight, more preferably 2 to 7 parts by weight, per 100 parts by weight of the components (A) and (B) in total. If the amount is less than 0.5 part by weight, sufficient thixotropy cannot be obtained, so that the composition before curing will flow or run when used in spot potting. If the amount exceeds 10 parts by weight, on the other hand, the composition has an increased viscosity with the result of lowered workability. The most preferable amount of the finely powdered silica is such that the resulting composition has a thixotropic index in the range of 1.5 to 3.0 preferably in the range of 2.0 to 2.7. The "thixotropic index" refers to the ratio of the apparent viscosity measured on a rotational viscometer at a lower rotation speed such as 4 to 12 rpm to that at a higher rotation speed such as 20 to 60 rpm, with the proviso that the ratio of the higher rotation speed to the lower rotation speed is at least 5, preferably in the range of 5 to 10.

Other Compounding Ingredients

In addition to the above components (A) to (D), other various compounding ingredients which are known per se may be incorporated in the composition according to the present invention. For example, reaction-controlling agents such as polymethylvinylsiloxane cyclic compounds, acetylene compounds, organic phosphorus compounds and the like may be added to the composition, whereby curing reaction can be controlled. Also, an organohydrogenpolysiloxane having at least one silicon-bonded hydrogen atom (SiH group) in its molecule may be added, to control the hardness of the silicone gel obtained, or the like.

Fluorosilicone Gel Composition

The fluorosilicone gel composition of the present invention can be easily prepared by mixing uniformly the above-described components. The composition has thixotropy, which enables effective operation in spot potting, for example. Besides, when heated to a temperature on the order of 60° to 150° C., the composition cures quickly to form a silicone gel. The gel has an appropriate degree of flexibility and is excellent in solvent resistance and free of shrinking or the like. Therefore, the present composition is highly suited to use as a protective material for semiconductor-type pressure sensors.

EXAMPLES

In the following examples, viscosity is given in values measured at 25° C., and "part(s)" refers to "part(s) by weight", and Me represents the methyl group and Vi represents the vinyl group. Thixotropic index was measured under a rotation speed ratio (lower-to-higher speed ratio) of 1:5.

The materials used for preparation of silicone gel compositions are as follows:

Polysiloxane A1:

A polysiloxane (viscosity: 3,000 cP) having the following formula:

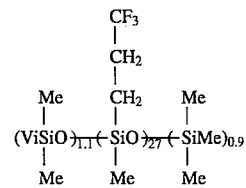

This polysiloxane was obtained as follows. A mixture of 742 g of 1,3,5,-trimethyl-1,3,5-tris(3,3,3-trifluoropropyl)cyclotrisiloxane, 0.3 g of water, 14.2 g of trimethylsilanol and 220 g of acetonitrile was stirred with temperature maintained at 10° C., and, after addition of 0.02 g of a pentacoordinate silicon catalyst represented by the following formula:

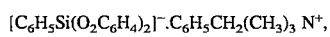

the mixture was polymerized for 5 hours. To the resulting polymer were then added 22 g of vinyldimethylchlorosilane and 35 g of divinyltetramethyldisilazane, thereby silylating the terminal ends of the molecule of the polymer. Subsequently, the reaction product mixture was heated under a reduced pressure to distill off solvents, followed by filtration of hydrochlorates, to yield a polysiloxane with a viscosity of 3,000 cP (Polysiloxane A1).

Polysiloxane A2:

A polysiloxane (viscosity: 5,000 cP) having the following formula:

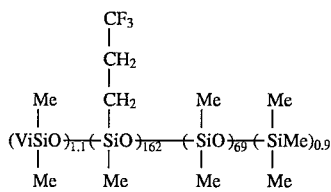

This polysiloxane was obtained as follows. To a mixture prepared by mixing 758 g of 1,3,5-trimethyl-1,3,5-tris(3,3,3-trifluoropropyl) cyclotrisiloxane, 153 g of [(CH$_3$)$_2$SiO]$_4$, 3.1 g of [CH$_2$=CH(CH$_3$)$_2$SiO]$_2$O and 2.2 g of [(CH$_3$)$_3$Si]$_2$O, was added 0.45 g CF$_3$SO$_3$H as an equilibration catalyst, and equilibration reaction was carried out at room temperature for 8 hours. After the reaction was over, the reaction mixture was neutralized by adding 18 g of sodium bicarbonate, and the resulting product was subjected to filtration to remove salts formed by neutralization and excess sodium bicarbonate. The product obtained was then subjected to stripping, to give a polysiloxane with a viscosity of 5,000 cP (Polysiloxane A2).

Hydrogenpolysiloxane B1:

A polysiloxane (viscosity: 30 cP) having the following formula:

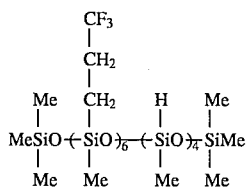

Catalyst C1:

A catalyst obtained by heating chloroplatinic acid and tetramethyldivinyldisiloxane (platinum content: 3% by weight in terms of platinum).

Finely powdered silica D1:

Aerosil R-972, a dimethyldichlorosilane-treated silica (specific surface area: 120 m$^2$/g, carbon amount contained on the hydrophobic surfaces: 0.8% by weight in terms of carbon quantity), produced by Degussa.

Finely powdered silica D2:

Cabosil TS-720, a hexmethyldisilazane-treated silica (specific surface area: 100 m$^2$/g, carbon amount contained on the hydrophobic surfaces: 4.5% by weight in terms of carbon quantity), produced by Cabot.

Finely powdered silica D3:

A fumed silica surface-treated with di(3,3,3-trifluoropropyl)tetramethyldisilazane (specific surface area: 200 m$^2$/g, carbon amount contained on the hydrophobic surfaces: 4.5% by weight in terms of carbon quantity).

EXAMPLE 1

In a planetary mixer, 100 parts of Polysiloxane A1 and 3.5 parts of Finely powdered silica D1 were mixed uniformly, followed by heating at 150° C. for 1 hour. The mixture obtained was cooled to room temperature, to which were then added 0.015 part of Catalyst C1, 0.05 part of ethynylcyclohexanol and 6.5 parts of Hydrogenpolysiloxane B1, followed by mixing uniformly to prepare a silicone gel composition.

Viscosity of the composition obtained was measured on a rotational viscometer at rotation speeds of 6 rpm and 30 rpm, and thixotropic index was calculated from the measured viscosity values. Further, the composition was heated at 150° C. for 1 hour to form a gel-like product, which was subjected to measurement of penetration by the method using a ¼-scale cone according to ASTM D 1403. The results are given in Table 1.

EXAMPLE 2

The procedure of Example 1 was repeated except for using the Finely powdered silica D1 in an amount of 3.0 parts, to prepare a silicone gel composition. The composition was subjected to measurement of viscosity, thixotropic index and gel penetration in the same manner as in Example 1. The results are given in Table 1.

EXAMPLE 3

The procedure of Example 1 was repeated except for using 3.5 parts of Finely powdered silica D2 in place of the Finely powdered silica D1, to prepare a silicone gel composition. The composition was subjected to measurement of viscosity, thixotropic index and gel penetration in the same manner as in Example 1. The results are given in Table 1.

COMPARATIVE EXAMPLE 1

The procedure of Example 1 was repeated except for using 3.5 parts of Finely powdered silica D3 in place of the Finely powdered silica D1, to prepare a silicone gel composition. The composition was subjected to measurement of viscosity, thixotropic index and gel penetration in the same manner as in Example 1. The results are given in Table 1.

COMPARATIVE EXAMPLE 2

The procedure of Example 1 was repeated except for using Polysiloxane A2 in place of the Polysiloxane A1 and using the Hydrogenpolysiloxane B1 in an amount of 1 part, to prepare a silicone gel composition. The composition was subjected to measurement of viscosity, thixotropic index and gel penetration in the same manner as in Example 1. The results are given in Table 1.

In this example, viscosity measurement for the composition was carried out at a rotational frequency of 4 rpm and at 20 rpm, and the thixotropic index was calculated from the measured viscosity values.

TABLE 1

|  | Example | | | Comparative Example | |
|---|---|---|---|---|---|
|  | 1 | 2 | 3 | 1 | 2 |
| Viscosity (P): | | | | | |
| at 6 rpm | 410 | 275 | 338 | 78 | (296) |
| at 30 rpm | 163 | 124 | 144 | 70 | (290) |
| Thixotropic index | 2.52 | 2.22 | 2.35 | 1.11 | 1.02 |
| Penetration | 45 | 43 | 43 | 46 | 50 |

What is claimed is:

1. A thixotropic fluorosilicone gel composition, comprising:

(A) an alkenyl group-containing organopolysiloxane having the following average formula (1):

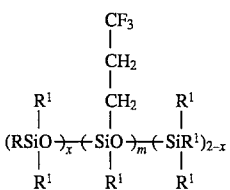

(1)

wherein

R is an alkenyl group, $(R^1)$'s may be the same or different and are each an alkyl group having 1 to 8 carbon atoms, phenyl group or 3,3,3-trifluoropropyl group, x is a number in the range of 0.3 to 2, and m is an integer of not less than 1, and a viscosity of 100 to 10,000 cP at 25° C., which has been prepared by subjecting a-cyclic trimer of methyl-3,3,3-trifluoropropylsiloxane to ring-opening polymerization in the presence of a pentacoordinate silicon catalyst at a temperature of 50° C. or below;

(B) an organohydrogenpolysiloxane having at least least 3 silicon-bonded hydrogen atoms in its molecule which has the following general formula (2):

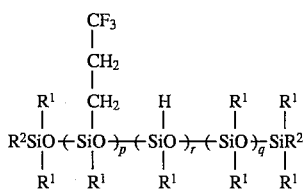

(2)

wherein $(R^1)$'s are each the same as above, $(R^2)$'s may be the same or different and are each a hydrogen atom, an alkyl group having 1 to 8 carbon atoms, phenyl group or 3,3,3-trifluoropropyl group, p and q are each an integer of not less than 0, and r is an integer of not less than 1, and a viscosity of 5 to 100 cP at 25° C.;

(C) a platinum catalyst; and (D) a finely powdered silica having a specific surface area of not less than 50 $m^2/g$ which has been rendered hydrophobic by treatment with a silazane, chlorosilane, alkoxysilane or polysiloxane having only methyl groups as substituent groups.

2. The composition of claim 1, wherein in the above average formula (1), R is vinyl and each $R^1$ is methyl.

3. The composition of claim 1, wherein the component (B) is present in an amount such as to provide 0.5 to 2.0 silicon-bonded hydrogen atoms per said alkenyl group in the component (A).

4. The composition of claim 1, wherein said finely powdered silica of component (D) has been surface treated with at least one compound selected from the group consisting of hexamethyldisilazane, trimethylchlorosilane, dimethyldichlorosilane, methyltrichlorosilane, trimethylalkoxysilane, dimethyldialkoxysilane, methyltrialkoxysilane, cyclic polydimethylsiloxanes and linear polydimethylsiloxanes.

5. The composition of claim 1, wherein the component (D) is present in an amount of 0.5 to 10 parts by weight per 100 parts by weight of the components (A) and (B) in total.

6. A silicone gel obtained by curing the thixotropic fluorosilicone gel composition as claimed in claim 1.

7. The composition of claim 1, wherein the ring-opening polymerization is carried out at a temperature in the range of 10° to 50° C.

* * * * *